United States Patent [19]

Kanazawa

[11] Patent Number: 5,033,792
[45] Date of Patent: Jul. 23, 1991

[54] ARMREST-ATTACHING MECHANISM
[75] Inventor: Yuzo Kanazawa, Gifu, Japan
[73] Assignee: Ikeda Bussan Co. Ltd., Ayase, Japan
[21] Appl. No.: 798,280
[22] Filed: Nov. 15, 1985
[30] Foreign Application Priority Data
  Nov. 16, 1984 [JP] Japan ............... 59-174722[U]
[51] Int. Cl.⁵ .................................. A47C 7/54
[52] U.S. Cl. .................................. 297/417; 297/113
[58] Field of Search ............ 297/417, 113, 411, 416
[56] References Cited
  U.S. PATENT DOCUMENTS

| | | | |
|---|---|---|---|
| 2,310,476 | 2/1943 | Todd | 297/367 X |
| 3,439,889 | 4/1969 | Karlsen | 297/416 X |
| 3,578,379 | 5/1971 | Taylor et al. | 297/411 X |
| 3,886,611 | 6/1975 | Lammy et al. | 297/417 X |
| 4,097,088 | 6/1978 | Meiller | 297/417 X |
| 4,229,040 | 10/1980 | Howell et al. | 297/417 X |
| 4,307,913 | 12/1981 | Spiegelhoff | 297/417 |
| 4,466,664 | 8/1984 | Kondor | 297/411 |

Primary Examiner—Peter R. Brown
Attorney, Agent, or Firm—Foley & Lardner

[57] ABSTRACT

An armrest attaching mechanism wherein armrest attaching brackets are attached to arms arranged at the seat back of a reclining seat. The arm is a member different from the seat cushion and seat back of the seat and the process of attaching the arm to the bracket can be thus made independent of the seat assembly process, thereby making the seat assembly process easy. The bracket is swingably attached to the arm to swing the armrest between its used position and its not-used position.

2 Claims, 2 Drawing Sheets

ARMREST-ATTACHING MECHANISM

BACKGROUND OF THE INVENTION

1. Field of the Invention

The present invention relates to an armrest attaching mechanism which enables the armrests to be easily attached to a seat back in a car, for example.

2. Description of the Prior Art

Various kinds of vehicles such as cars have seats to which armrests are attached to make the person, who is seated on the seat, sit comfortably. An example of the conventional armrest attaching mechanism employed in the case of these vehicles is shown in FIG. 1, wherein reference numeral 11A represents a frame for forming the seat back, and an armrest 2 is attached directly to the frame 11A in such a manner that a bracket 3 is swingably attached to each of the sides of the frame 11A by a pin 13 and that the armrest 2 is fixed to the bracket 3 by pins 14 and 15.

Conventionally, the bracket 3 to which the armrest was attached was attached to the frame 11A which was housed in the seat back. The attaching of the armrest 2 to the bracket 3 must be therefore done during process of seat assembly, thereby making the production process difficult.

SUMMARY OF THE INVENTION

The object of the present invention is to provide an armrest attaching mechanism which makes the attaching of the recliner easy to enhance the productivity of seat assembly.

In order to achieve the object of the present invention, armrest attaching brackets are attached to arms of a seat recliner which is to be attached to one side of the seat back.

When so arranged, armrests are attached to the arms of the seat recliner, which is attached to one side of the seat back, through the brackets.

According to the present invention, therefore, the process of assembling the seat can be separated from the process of attaching the armrests, thereby making the seat assembling process extremely easy.

DETAILED DESCRIPTION OF THE PREFERRED EMBODIMENT

Figure 1:
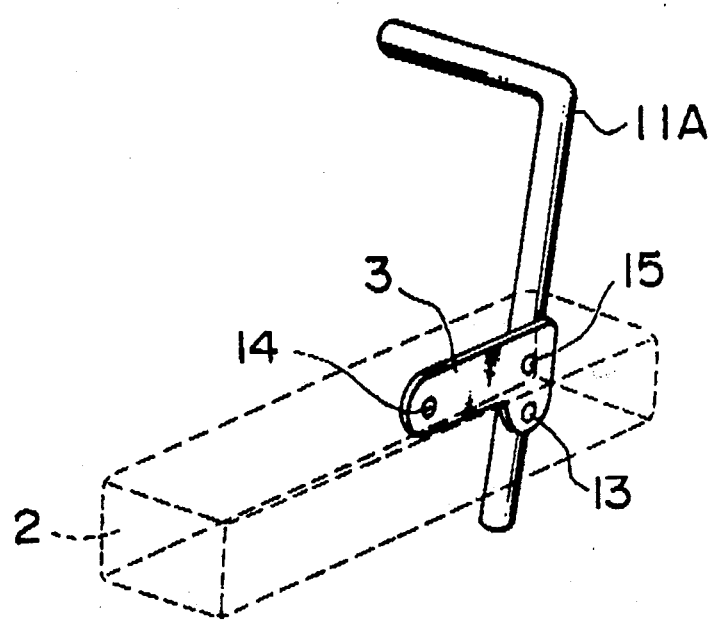
FIG. 1 shows the conventional armrest attaching mechanism.
Figure 2:
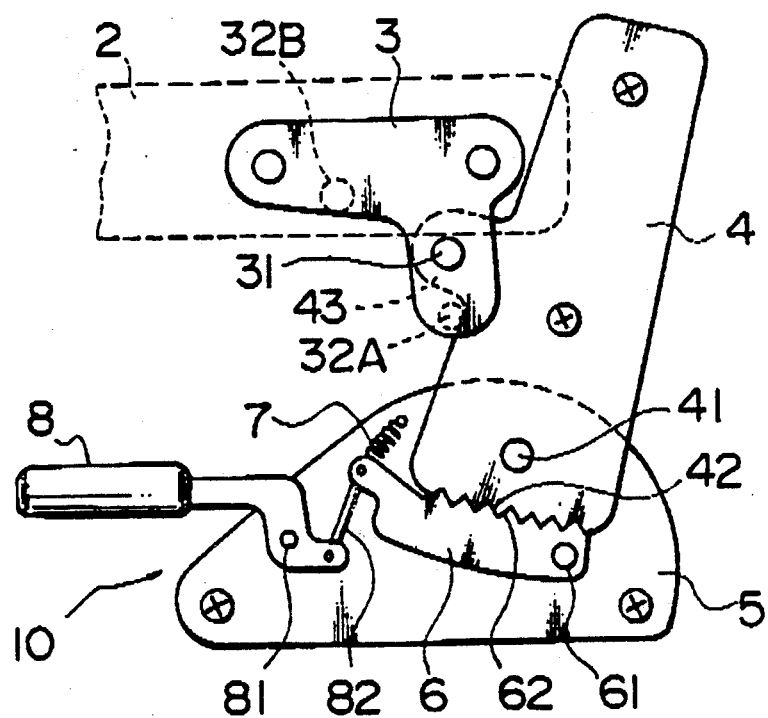
FIG. 2 shows an embodiment of the present invention wherein the armrests are in use.
Figure 3:
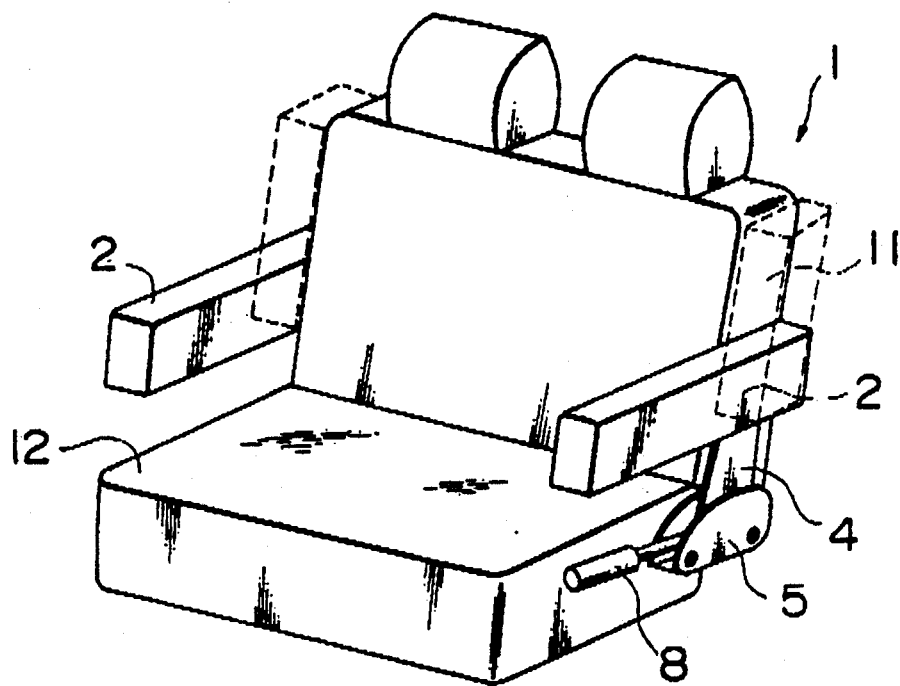
FIG. 3 is a perspective view showing a seat to which the armrests of the present invention are attached.
Figure 4:
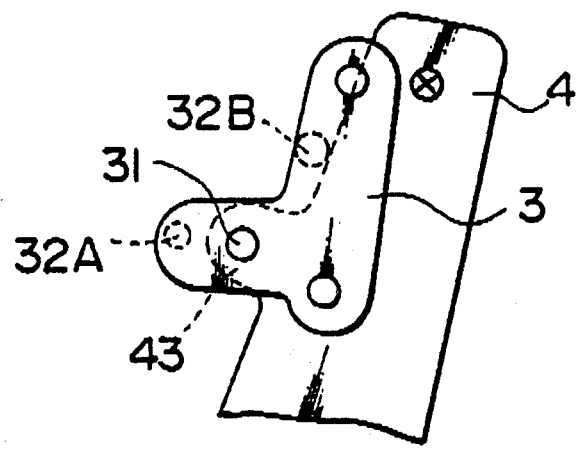
FIG. 4 is a side view showing the bracket at the time when the armrests are in non-use.

The present invention will be described by means of an embodiment thereof shown in FIGS. 2 and 3. A seat 1 includes a seat back 11, seat cushion 12, and a seat recliner 10 arranged between the seat back 11 and the seat cushion 12. Both sides of the seat back 11 are supported by arms 4. The arm 4 is swingably attached to a base 5 through a pivot shaft 41 and provided with upper teeth 42 at the lower edge thereof, which are engaged with lower teeth 62 of an engagement member 6 freely swingably attached to the base 5 through a pivot shaft 61. The engagement member 6 is urged upward by a spring 7 located between the engagement member 6 and the base 5 and connected to a lever 8 through a connector rod 82. The lever 8 is freely swingably attached to the base 5 through a shaft 81. A protrusion 43 is projected from the front edge of the arm 4 in the center thereof and a bracket to which an armrest 2 is attached is freely swingably attached to the protrusion 43 through a pivot shaft 31. Stopper pins 32A and 32B project from the inner face of the bracket 3 (or back face of the bracket 3 in FIG. 2). These stopper pins 32A and 32B strike at the front edge of the arm 4 to limit the bracket 3, that is, the armrest 2 which is swung between its used position and its not-used position.

When the lever 8 is pulled up by hand, the engagement member 6 is swung downward through the connector rod 82 against the spring 7 and the lower teeth 62 thereof are thus released from the upper teeth 42 of the arm 4, thereby enabling the seat back 11 to be reclined through the arm 4. When the lever 8 is released at a predetermined position where the seat back 11 is to be located, the engagement member 6 is pulled upward by the spring 7 to engage the lower teeth 62 of the engagement member 6 with the upper teeth 42 of the arm 4, thereby fixing the seat back 11 at the predetermined position. When the armrests 2 are brought into their used position, as shown by solid lines in FIG. 3, the stopper pin 32A of the bracket 3 strikes against the lower front edge of the protrusion 43 of the arm 4, as shown in FIG. 2, to hold the armrests 2 horizontal. when the armrests 2 are to be brought into their not-used position, they are swung upward. When they are positioned as shown by broken lines in FIG. 3, the stopper pin 32B of the bracket 3 strikes against the upper front edge of the protrusion 43 of the arm 4 to hold them there. When the arms 4 to which the brackets 3 have been previously attached are attached to both sides of the seat back 11, the attaching of the brackets 3 can be made extremely easy.

Although the present invention has been described, citing a preferred embodiment thereof, it should be understood that the present invention is not limited to this embodiment but that various changes and modifications can be made without departing from the spirit and scope of the present invention.

What is claimed is:

1. An armrest attaching mechanism for a vehicle seat and the like, comprising:
   (a) a seat cushion,
   (b) a seat back,
   (c) a base member attached to said seat cushion,
   (d) an arm member attached to said seat back and pivotally connected to said base member,
   (e) means for reclining said seat back relative to said seat cushion,
   (f) an armrest,
   (g) means for attaching said armrest to said reclining means including:
      (1) a bracket pivotally mounted on said arm,
      (2) said armrest being fixedly attached to said bracket,
      (3) a pair of stopper means on said bracket, one stopper means striking a first portion of said arm when said armrest is in a used position, and the other stopper means striking a second portion of said arm when said armrest is in a not-used position, and
      (4) a protrusion on said arm and said bracket being pivotally mounted on said protrusion.

2. The mechanism of claim 1 wherein said one stopper means strikes said arm on a first side of said protrusion and said other stopper means strikes said arm on a second side of said protrusion.

* * * * *